United States Patent [19]
Wong

[11] Patent Number: 5,930,951
[45] Date of Patent: Aug. 3, 1999

[54] SECTIONAL PLANTING POT

[76] Inventor: Toh-Hing Wong, Flat F, 10/F, Tower 2 June Garden, 28 Tung Chau St., Kowloon, The Hong Kong Special Administrative Region of the People's Republic of China

[21] Appl. No.: 08/960,197

[22] Filed: Oct. 29, 1997

[51] Int. Cl.⁶ .................................................. A01G 25/00
[52] U.S. Cl. ............................................................. 47/66.1
[58] Field of Search ................................. 47/65.5, 66.1, 47/82, 83; 220/4.26, 4.27, 8

[56] References Cited

U.S. PATENT DOCUMENTS

| | | |
|---|---|---|
| 661,411 | 11/1900 | Lonitz . |
| 2,416,142 | 2/1947 | Bennett .................................. 220/4.26 |
| 3,009,603 | 11/1961 | Stockdale ............................. 47/65.5 X |
| 3,374,575 | 3/1968 | Tong . |
| 3,990,179 | 11/1976 | Johnson et al. .............................. 47/83 |
| 4,115,950 | 9/1978 | Lantai ......................................... 47/83 |
| 4,145,841 | 3/1979 | Woolpert ................................. 47/66.1 |
| 4,429,786 | 2/1984 | Hucal ..................................... 220/4.27 |
| 4,561,208 | 12/1985 | Schultz ....................................... 47/83 |
| 5,309,671 | 5/1994 | Byun .......................................... 47/83 |
| 5,401,200 | 3/1995 | Ellis ...................................... 220/4.27 |
| 5,404,672 | 4/1995 | Sanderson ................................... 47/82 |
| 5,422,129 | 6/1995 | Draddy .................................. 220/4.26 |
| 5,438,797 | 8/1995 | Lendel ....................................... 47/82 |

*Primary Examiner*—Michael J. Carone
*Assistant Examiner*—Elizabeth Shaw
*Attorney, Agent, or Firm*—Terrance L. Siemens

[57] ABSTRACT

A modular, threaded container for growing plants and subsequently increasing size of the container. Modules are arranged to be stacked on one another to increase overall height of the modular assembly. Individual modules include a top module having bottom threading only, intermediate modules open at the top and bottom and having top and bottom threading, and a bottom module having a floor and threading at the top only. The container may optionally include frustoconical modules, a first frustoconical bottom module configured to replace an open intermediate module with a module closed at the bottom, and a second frustoconical module closed at the bottom of dimensions and configuration different from those of the first bottom module. The plant is grown in a container having relatively few modules. After growth has occurred, the bottom module is removed and an intermediate module open at both ends is filled with growing medium and is inserted in series prior to replacing the bottom module. Alternatively, a different bottom module is employed.

8 Claims, 4 Drawing Sheets

SECTIONAL PLANTING POT

BACKGROUND OF THE INVENTION

1. Field of the Invention

The present invention relates to a modular, extensible pot having plural threadedly attachable sections. A significant use of the invention is minimizing mechanical damage and shock to delicate plants during repotting. The bottom module may be removed from the pot without dislodging the root ball from an upper module. An intermediate module may be installed below the upper module, after which a new bottom module may be attached. Thus, effective root depth is accommodated while eliminating potentially injurious removal from a pot.

2. Description of the Prior Art

Flower pots are commonly employed to contain a growing medium such as soil to grow plants. As a plant grows, it may outgrow its original flower pot. This frequently requires that the plant be repotted in a larger pot. In some cases, this operation may be objectionable. For example, some plants when young have delicate root systems which would typically be subjected to shock if dislodged from the original pot. In other cases, the plant may not be subjected to injurious influences by repotting. The gardener or horticulturalist may instead be subjected to injury if the plant has thorns or spines obstructing access to the root ball from above. In these cases it would be extremely useful to be able to remove the bottom portion of the pot and reinstall in its place a bottom portion having greater volummetric capacity.

Variable capacity pots are known. An example is seen in U.S. Pat. No. 4,115,950, issued to Kálmán Lantai on Sep. 26, 1978. A planting container described in this patent is built up by placing successive modules onto the existing modules. By contrast, in the present invention, modules thread to one another, so that firstly, the assembled container may be grasped and lifted from the top, and secondly, downward expansion of the pot is enabled.

U.S. Pat. No. 661,411, issued to Hugo Lonitz on Nov. 6, 1900, U.S. Pat. No. 3,990,179, issued to Rick S. Johnson et al. on Nov. 9, 1976, and U.S. Pat. No. 5,309,671, issued to Bok K. Byun on May 10, 1994, illustrate stackable plant containers having modules of variable diameter sections. The subject modules of this group do not thread together.

None of the above inventions and patents, taken either singly or in combination, is seen to describe the instant invention as claimed.

SUMMARY OF THE INVENTION

The present invention provides a flower pot which is downwardly extensible in modular fashion, and a method of growing plants based upon the novel flower pot. The pot includes thread, stackably connected modular sections. The outer walls of the various modules are coordinated in configuration and dimensions so that once threaded together, they collectively describe a generally uninterrupted cylindrical or frustoconical surface.

Only one module has a floor, that module having threads at the top of its lateral wall. The other modules have threads and are open at two ends. Optionally, a top end module is provided having threading only at one end, the other end being smooth and unencumbered by threading. Once tightened, the threads are protected against prolonged exposure to moisture and chemicals which could distort, degrade, and adhere together the constituent material of the threads. Thus there are no joining elements which remain exposed to the environment of the growing medium and would otherwise be susceptible to injurious influences arising from exposure to moisture and a soil environment over time.

The novel construction enables a plant growing in the pot to be provided with additional growing space below its existing root ball. The bottom module is unthreaded from one or more modules above. A module open at the bottom and top, and bearing threads corresponding to those of the now removed bottom module replaces the removed bottom module. An additional bottom module may then be threaded to the module just added. Additional growing medium, such as sand, soil, vermiculite, and others, may be added to that surrounding the root ball, thereby allowing the root system of the plant additional growing space.

In an alternative usage, the bottom module may be removed to enable pushing the root ball upwardly, out from the flower pot. This usage may find application with spiny or thorny plants not susceptible to being grasped or manipulated by hand from above the soil line.

The novel construction enables a flower pot to be increased in volumetric capacity while maintaining a relatively constant aesthetic appearance. Wall thickness and in the case of cylindrical modules, interior and exterior diameters, remain constant. This characteristic assists in pushing root balls free from the pot, when it is desired to remove the plant entirely from the pot and this must be accomplished from below.

Accordingly, it is a principal object of the invention to provide a flower pot which can be extended in modular fashion to increase growing space for the root system of a plant.

It is another object of the invention to avoid disturbing the root ball of a plant while increasing growing space.

It is a further object of the invention to maintain the overall aesthetic appearance of a modular flower pot.

Still another object of the invention is to assure that the wall thickness of a flower pot remain constant even when the flower pot comprises modular sections.

An additional object of the invention is to enable pushing of a root ball lodged within a flower pot from the bottom.

It is again an object of the invention to protect joining or fastening elements of the modules from injurious influences arising from exposure to moisture and a soil environment.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Various other objects, features, and attendant advantages of the present invention will become more fully appreciated as the same becomes better understood when considered in conjunction with the accompanying drawings, in which like reference characters designate the same or similar parts throughout the several views, and wherein.

DETAILED DESCRIPTION OF THE PREFERRED EMBODIMENTS

Figure 1:
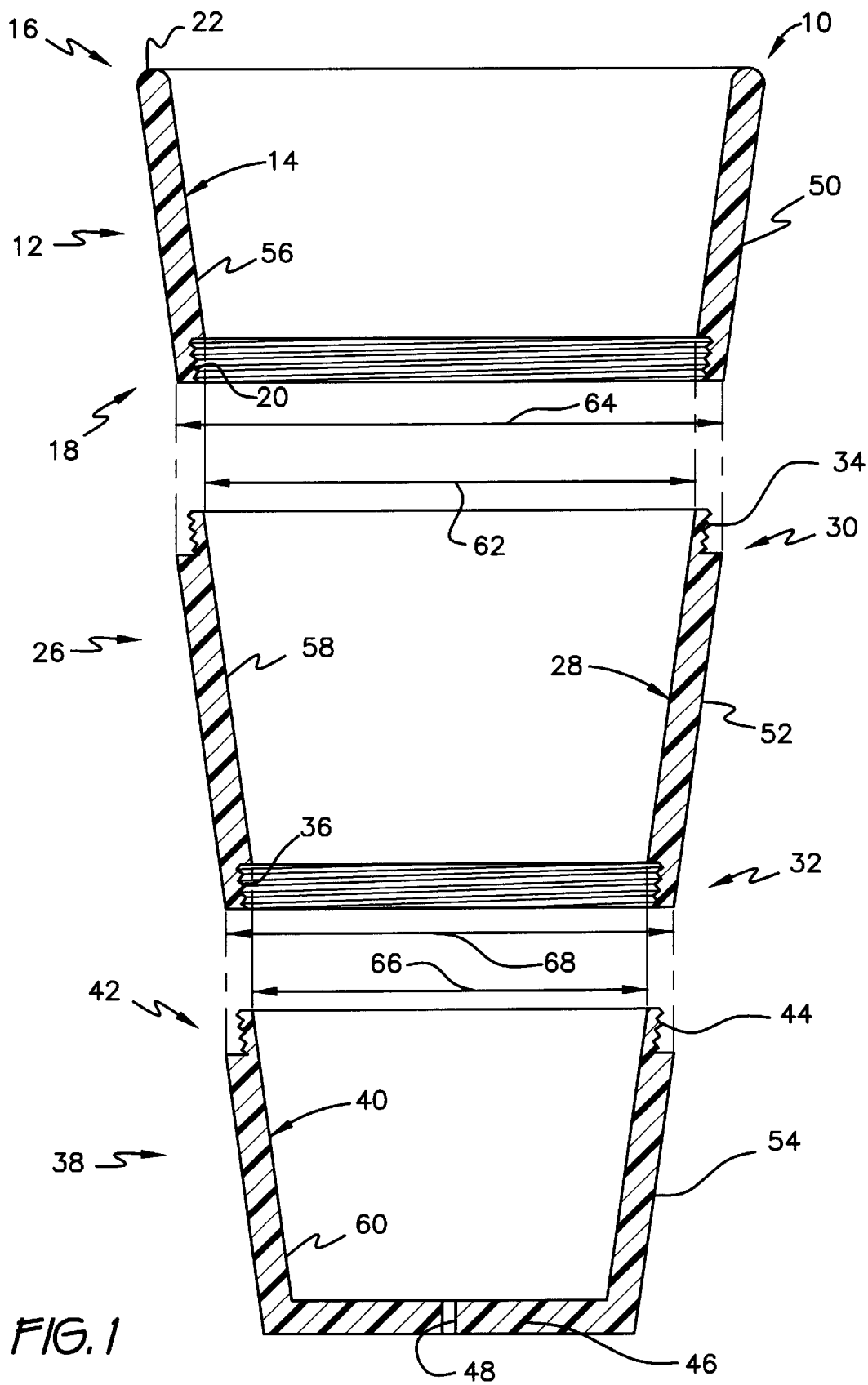
FIG. 1 is an exploded side cross sectional view of the novel apparatus.

Turning now to FIG. 1 of the drawings, modular container 10 comprises an uppermost or first module 12 having a lateral wall 14 having a top end 16 and a bottom end 18 bearing threads 20. For aesthetic purposes, top end 16 of wall 14 has a plain exterior upper surface 22 unencumbered by fastening structure such as threads 20 formed in bottom end 18.

A second module 26 has a lateral wall 28 having a respective top end 30 and bottom end 32. Top end 30 bears threads 34 for engaging threads 20. Bottom end 32 bears threads 36. Module 12 may be threaded to module 26 by respective threads 20 and 34.

A third module 38 having a third lateral wall 40 includes a top end 42 bearing threads 44 for engaging threads 36 and a bottom 46 closing lateral wall 40. Optionally, bottom 46 has a drain hole 48 passing therethrough.

Modules 12, 26, 38 are all characterized in that their respective threads 20, 34, 36, 44 are all contained within the confines of the inner and outer surfaces of the respective module lateral walls. The threads need not literally be located between these surfaces, as the interior and exterior surfaces are not of equal dimensions, but rather between these surfaces or their hypothetical projections beyond the module. Thus when any two or all of modules 12, 26, and 38 are joined by threading together, they collectively form a frustoconical configuration wherein respective exterior wall surfaces 50, 52, and 54 form a common smooth, continuous frustoconical surface, with only a thin line of the seam formed between any two abutting modules 12, 26, 38 indicating that the whole is formed from separable parts. Preferably, uppermost and lowermost surfaces of the ends 18, 30, 32, and 44 of respective modules 12, 26, and 38 are flat and horizontal, so that the seam visible upon assembly is minimized in magnitude and conspicuousness. Interior surfaces 56, 58, and 60 are similarly configured in that they also describe a generally continuous interior surface when joined. Interior and exterior surfaces 50 and 56, 52 and 58, or 54 and 60 are preferably parallel, so that when modules 12, 26, and 38 are joined, wall thickness of assembled container 10 is constant along the entire combined extents of lateral walls 14, 28, and 40.

Modules 12, 26, 38 have the following characteristics to assure that wall thickness is constant after assembly and that interior and exterior surfaces 50, 52, 54, 56, 58, 60 are parallel. Bottom end 18 of module 12 has a bottom end inner diameter 62 and a bottom end outer diameter 64. Top end 30 of module 26 has a top end inner diameter equivalent to bottom end inner diameter and also shown as 62, and a top end outer diameter equivalent to bottom end outer diameter and also shown as 64.

Module 38 has a top end inner diameter equivalent to the bottom end inner diameter of module 26. These diameters are shown as 66. The top end outer diameter of module 38 is equivalent to the bottom end outer diameter of module 26. The latter diameters are shown as 68.

Figure 2:
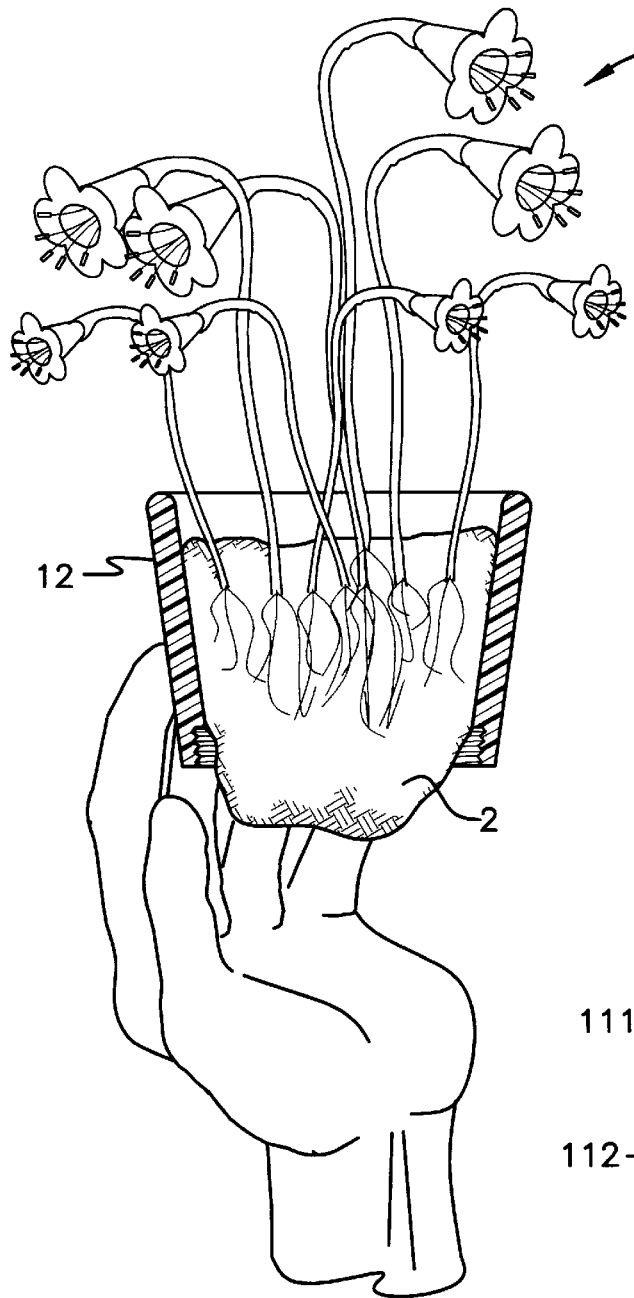
FIG. 2 is an environmental, side cross sectional view of an element of the novel apparatus.

Threads 20, 34, 36, and 44 are located between their respective interior and exterior wall surfaces 50 and 56, 52 and 58, or 54 and 60, so that constant wall thickness and continuity of the overall interior and exterior surfaces 50, 52, 54, 56, 58, 60 are preserved. This characteristic both improves aesthetics and also enables a plant to be removed from container 10 without disturbing delicate feeder roots. This ability is illustrated in FIG. 2. With modules 26 and 38 removed, root ball 2 of plant 4 may be urged upwardly without encountering interiorly extending projections, and thus may be entirely removed with minimal disturbance to plant 4.

Figure 3:
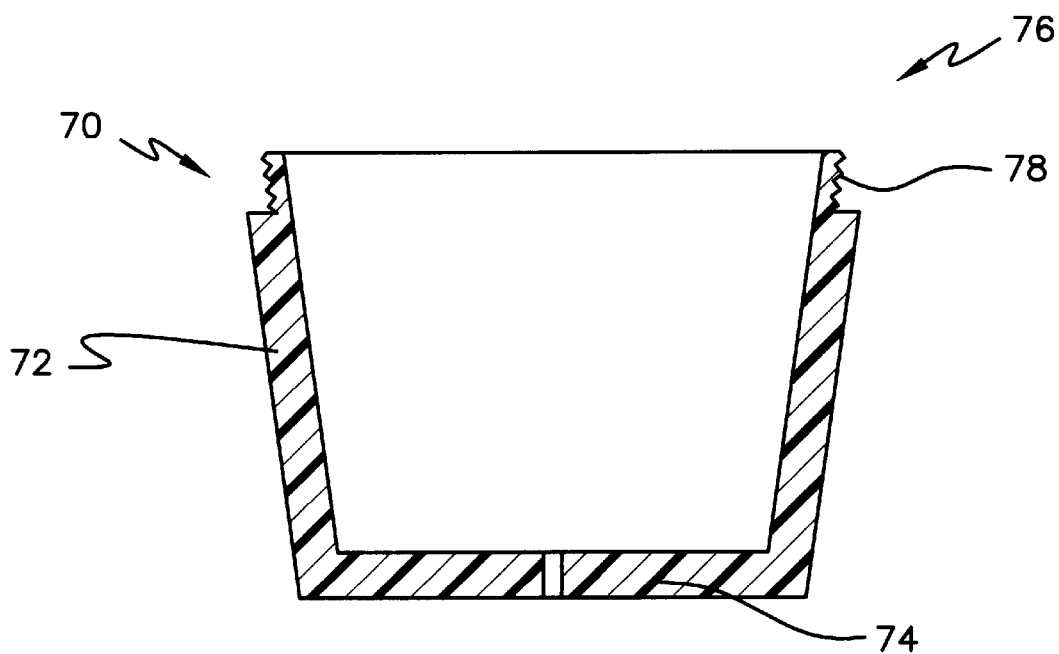

Turning now to FIG. 3, there is shown a fourth module 70 having a lateral wall 72 and a bottom 74 closing lateral wall 72. Wall 72 of module 70 has a top end 76 bearing threads 78 equivalent to threads 34 of module 26. In overall dimensions and configuration, module 70 is generally similar to module 26 of FIG. 1. This enables module 70 to replace module 26, maintaining overall frustoconical configuration and to form a closed bottom for module 12. This substitution would reduce overall height and capacity of container 10. Alternatively, the user could start with modules 12 and 70, and subsequently expand to the assembly depicted in FIG. 1.

Figure 4:
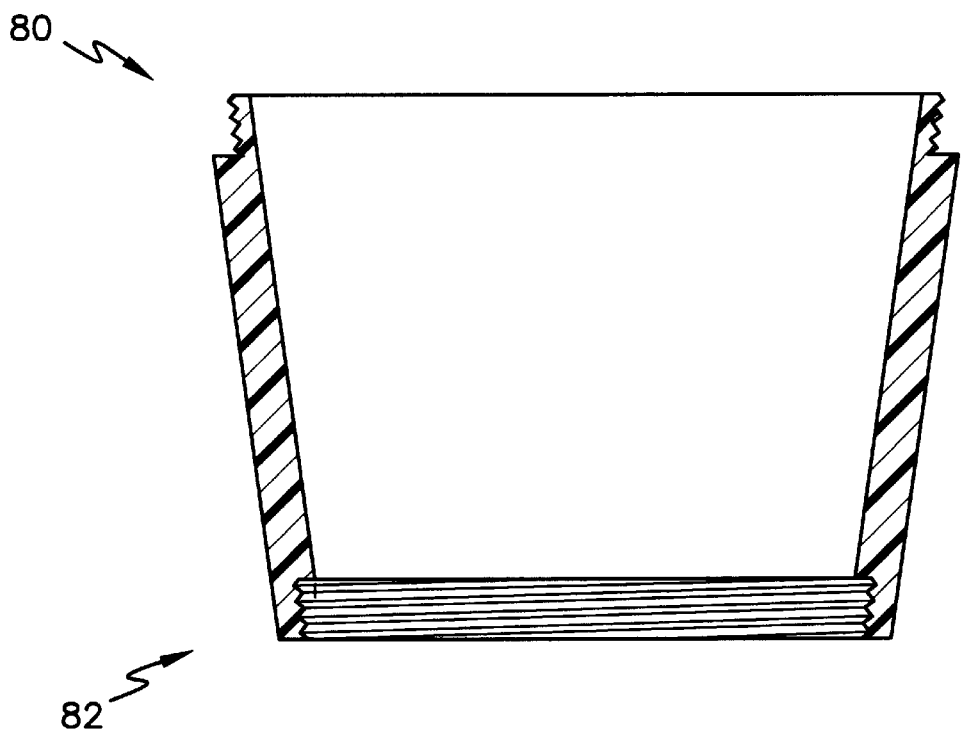
FIGS. 3 and 4 are side cross sectional views of optional elements of the novel apparatus, which optional elements may be substituted for some elements shown in FIG. 1.

Still further expansion of the capacity may be accomplished by incorporating additional modules, such as module 80 of FIG. 4. Module 80 is of generally similar dimensions and configuration as those of module 38, but eliminates bottom 46 of module 38 in favor of an open bottom end 82. Threads 84 are provided at bottom end 82 to accommodate still additional modules (not shown). Obviously, the novel container may be extended continuously by adding further modules.

Figure 5:
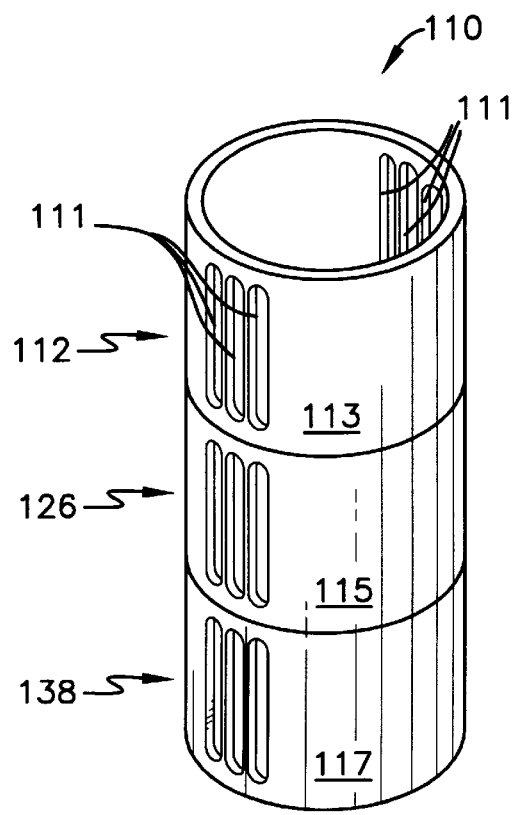
FIG. 5 a perspective view of an alternative embodiment of the invention.

Thus far, the invention has been shown and described as having frustoconical configuration. Other configurations are possible. As seen in FIG. 5, the various modules 112, 126, 138, and hence container 110, may be cylindrical. FIG. 5 also shows an optional feature enabling improved grasp of each module 112, 126, or 138 for securing and unthreading threads. Threads, as well as abutting upper and lower surfaces and interior surfaces of modules 112, 126, and 138 are not shown, but are functionally similar to their counterparts of the embodiment of FIG. 1. Each module 112, 126, or 138 has outwardly oriented projections, such as ribs 111 disposed upon respective exterior lateral surfaces 113, 115, 117. Ribs 111 provide modules 112, 126, 138 with grips for threading and unthreading.

Obviously, the outer configuration of the various modules and hence of the assembled container may be varied from those described. The outer configuration may include flat facets (not shown) or even irregular configuration, or any combination of these characteristics.

Figure 6:
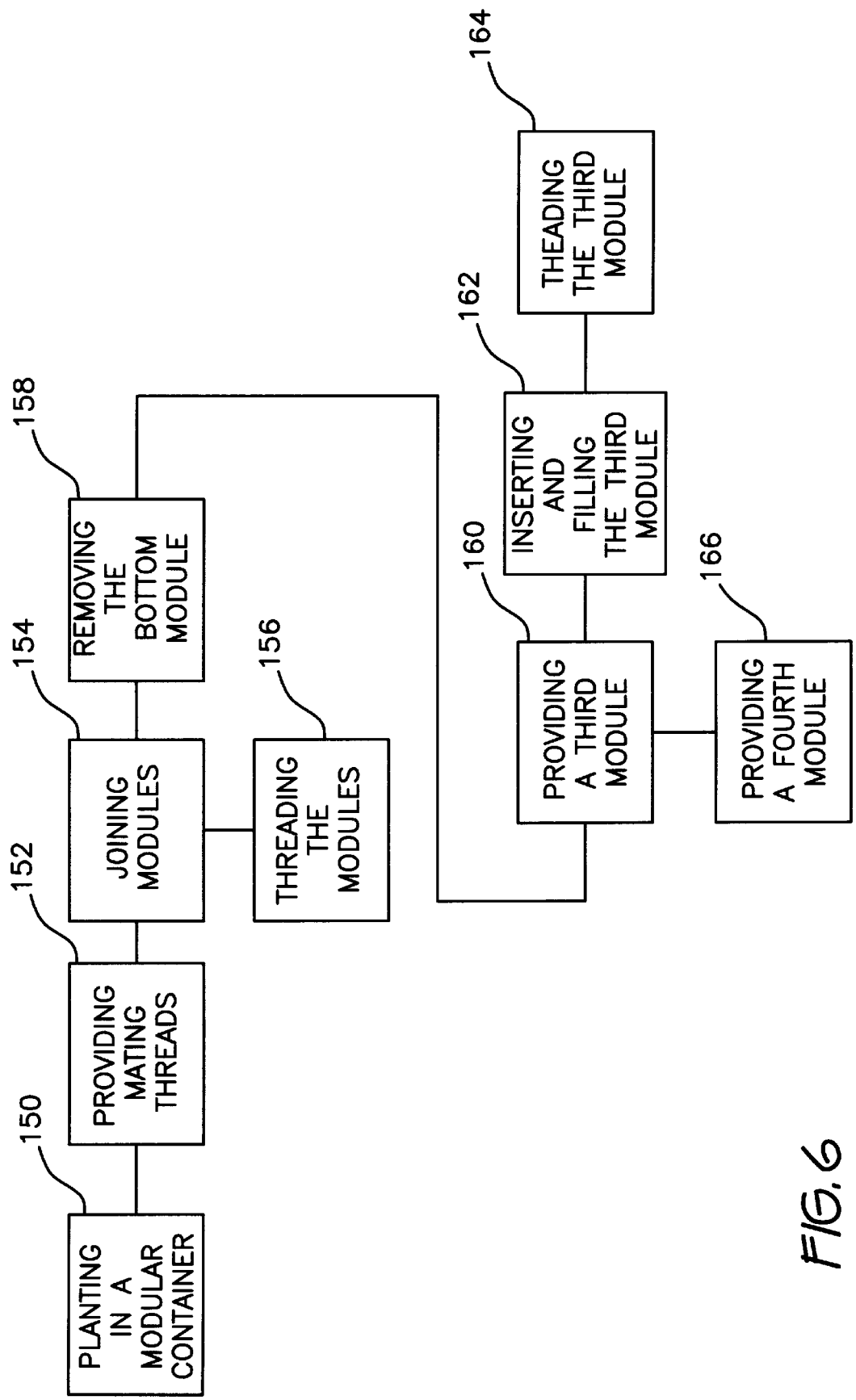
FIG. 6 is a block diagram summarizing steps of a novel method employing the apparatus shown in prior drawing figures.

The apparatus set forth above may be employed to grow a plant in a container and subsequently increase the size of the container. As summarized in FIG. 6, a method of accomplishing the above comprises the following steps. A first step 150 is that of planting the plant 4 in a growing medium 2 in a container 10 or 110 having a first module 12 (or 112) open at the top and bottom and a removable second module 70 (or 138) closed at the bottom. Next, in step 152, mating threads 20 and 78 (or their equivalents in the embodiment of FIG. 5), are provided for modules 12 and 70 (or alternatively, modules 112 and 138). A step 154 is that of joining the first module 12 (or 112) to the second module 70 (or 138). Although the various modules could be snap fit together or joined in some other way, thereby eliminating step 152, step 154 preferably comprises a further step 156 of threading module 12 (or 112) to module 70 (or 138).

After some time has passed and plant 4 has grown, the bottom module is removed, as shown in step 158. If the container is of constant thread diameter, as would be the case in the embodiment of FIG. 5, then a third module 126 matingly compatible with the threads of the top and bottom modules 112 and 138 is provided, as shown in step 160. In a step 162, the third module 126 is inserted between the first module 112 and the second module 138, and the third module 126 is filled with additional growing medium 2. Preferably, step 162 comprises a further step 164 of threading third module 126 to first module 112 and to second module 138.

If the container is of the embodiment of FIGS. 1, 3, and 4, then steps 160, 162, and 164 are still practiced as summarized, but with different elements of the invention. In step 160, the third module would be module 26 of FIG. 1. Since module 26 has a smaller bottom end 32 than top end 30, unlike the cylindrical nature of the embodiment of FIG. 5, an additional step 166 must be included, that of providing a fourth module 38 compatible with the third module 26. Module 38 is closed at the bottom, where protection from escape of water from growing medium 2 is desired.

It is to be understood that the present invention is not limited to the embodiments described above, but encompasses any and all embodiments within the scope of the following claims.

I claim:

1. A modular container comprising:

a first module having a first lateral wall having an inner surface and an outer surface, a first top end and a first bottom end bearing first threads contained within the confines of said inner surface and said outer surface of said first lateral wall, wherein said first top end is open and said first bottom end is open;

a second module having a second lateral wall having an inner surface, an outer surface, a second top end bearing second threads engageable with said first threads, and a second bottom end bearing third threads, said second threads and said third threads contained within the confines of said inner surface and said outer surface of said second lateral wall, wherein said second top end is open and said second bottom end is open; and a third module having a third lateral wall including an inner surface, an outer surface, a third top end bearing fourth threads engageable with said third threads of said second module, wherein said third top end is open, said fourth threads contained within the confines of said inner surface and said outer surface of said third lateral wall, and a bottom closing said third lateral wall, wherein said first lateral wall of said first module has a first bottom end inner diameter and a first bottom end outer diameter, and said second top end of said second module has a second top end inner diameter equivalent to said first bottom end inner diameter and a second top end outer diameter equivalent to said first bottom end outer diameter, and said second bottom end of said second module has a second bottom end inner diameter and a second bottom end outer diameter, and said third top end of said third module has a third top end inner diameter equivalent to said second bottom end inner diameter and a third top end outer diameter equivalent to said second bottom end outer diameter, whereby said modular container has a constant wall thickness along its entire height.

2. The modular container according to claim 1, said first lateral wall of said first module having a plain exterior upper surface unencumbered by fastening structure.

3. The modular container according to claim 1, said bottom of said third module having a drain hole passing therethrough.

4. The modular container according to claim 1, said first module, said second module, and said third module having respective exterior lateral surfaces and outwardly oriented projections disposed upon said exterior lateral surfaces, whereby said first module, said second module, and said third module are provided with grips for threading and unthreading.

5. The modular container according to claim 1, further comprising a fourth module having a fourth lateral wall and a second bottom closing said fourth lateral wall, said fourth lateral wall having a fourth top end bearing fifth threads equivalent to said second threads of said second top end of said second module, whereby said fourth module may replace and form a closed bottom for said first module.

6. The modular container according to claim 1, wherein said first module, said second module, and said third module are configured to be frustoconical when assembled to one another.

7. A method of growing a plant in a container and increasing the size of the container, comprising the steps of:

planting the plant in a growing medium in a container having a first module open at the top and bottom, and a removable second module closed at the bottom;

joining the first module to the second module;

removing the bottom module after the plant has grown;

providing a third module which is matingly compatible with the first module and with the second module; and inserting the third module between the first module and the second module, and filling the third module with growing medium.

8. The method according to claim 7, comprising the further step of providing mating threads to the first module, the second module, and the third module, and wherein said step of joining the first module to the second module comprises a further step of threading the first module to the second module, and said step of inserting the third module between the first module and the second module comprises a further step of threading the third module to the first module and to the second module.

* * * * *